(12) United States Patent
Krug et al.

(10) Patent No.: US 9,489,055 B2
(45) Date of Patent: Nov. 8, 2016

(54) HARD KEY CONTROL PANEL FOR A VIDEO PROCESSING APPARATUS AND VIDEO PROCESSING SYSTEM

(71) Applicant: Scalable Video Systems GMBH, Weiterstadt (DE)

(72) Inventors: Alfred Krug, Kirchzell (DE); Sven Papke, Laudenbach (DE)

(73) Assignee: Scalable Video Systems GMBH, Weiterstadt (DE)

( * ) Notice: Subject to any disclaimer, the term of this patent is extended or adjusted under 35 U.S.C. 154(b) by 0 days.

(21) Appl. No.: 14/763,604

(22) PCT Filed: Feb. 2, 2014

(86) PCT No.: PCT/EP2014/051974
§ 371 (c)(1),
(2) Date: Jul. 27, 2015

(87) PCT Pub. No.: WO2014/122081
PCT Pub. Date: Aug. 14, 2014

(65) Prior Publication Data
US 2015/0355724 A1    Dec. 10, 2015

(30) Foreign Application Priority Data
Feb. 8, 2013    (EP) ..................................... 13154728

(51) Int. Cl.
*H04N 5/222*    (2006.01)
*G06F 3/023*    (2006.01)
(Continued)

(52) U.S. Cl.
CPC ........... *G06F 3/023* (2013.01); *G06F 3/03543* (2013.01); *H04N 5/222* (2013.01); *H04N 5/262* (2013.01); *H04N 5/268* (2013.01)

(58) Field of Classification Search
USPC ....... 348/722, 729, 719, 706, 705, 700, 659, 348/600, 589, 587, 586, 584, 578, 376, 269, 348/239, 211.14, 211.7, 131, 153, 158, 159, 348/49, 50, 68, 69, 73; 715/700, 719, 723, 715/762, 763, 765
See application file for complete search history.

(56) References Cited

U.S. PATENT DOCUMENTS 5,097,221 A * 3/1992 Miller .................... H03D 3/002
329/318
5,491,517 A * 2/1996 Kreitman ............. H04N 5/2628
348/581

(Continued)

FOREIGN PATENT DOCUMENTS

DE    10336214 A1    3/2004
EP    2 683 155 A1    1/2014

OTHER PUBLICATIONS

EP Search Report of Apr. 7, 2014.

*Primary Examiner* — Jefferey Harold
*Assistant Examiner* — Mustafizur Rahman
(74) *Attorney, Agent, or Firm* — Meagher Emanuel Laks Goldberg & Liao, LLP

(57) ABSTRACT

A control panel comprising a plurality of hard key buttons which are arranged in different groups is suggested. A first group of buttons is assigned to select predefined scene settings. A second group of buttons is assigned to select signals for a currently broadcasted scene. A third group of buttons is assigned to select signals for a next scene which is selectable by operating a button of the first group. The hardware control panel provides an operating interface that matches with the workflow of TV productions. It enables context related direct access to all functionalities which are needed during the TV show. However, it does not provide access to those functionalities which are not needed in a specific scene. Hence, it significantly reduces or even prevents malfunctions during a TV production.

14 Claims, 8 Drawing Sheets

Figure 1:
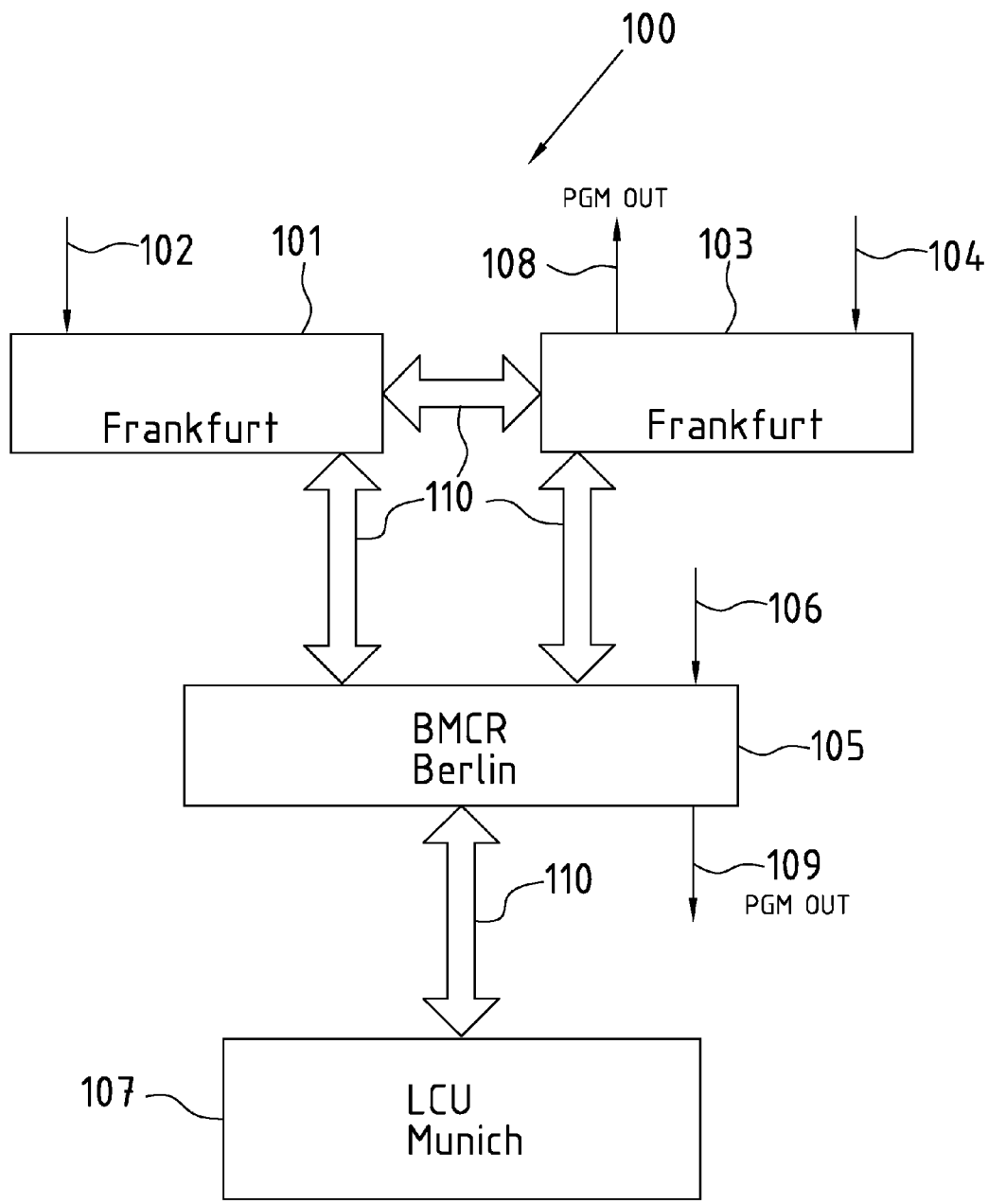

(51) Int. Cl.
*G06F 3/0354* (2013.01)
*H04N 5/262* (2006.01)
*H04N 5/268* (2006.01)

(56) References Cited

U.S. PATENT DOCUMENTS

| | | | | |
|---|---|---|---|---|
| 5,801,685 A * | 9/1998 | Miller | G11B 27/034 | 715/202 |
| 5,852,435 A * | 12/1998 | Vigneaux | G06F 17/30017 | 345/428 |
| 5,889,950 A * | 3/1999 | Kuzma | H04N 7/165 | 348/461 |
| 5,905,493 A * | 5/1999 | Belzer | G06F 3/0219 | 400/487 |
| 6,091,407 A * | 7/2000 | Boetje | H04H 60/06 | 348/722 |
| 6,188,141 B1 * | 2/2001 | Daviaud | G07C 9/00309 | 180/287 |
| 6,278,497 B1 * | 8/2001 | Sumiyoshi | G11B 27/034 | 348/564 |
| 6,320,600 B1 * | 11/2001 | Smith | G11B 27/031 | 348/722 |
| 6,353,461 B1 * | 3/2002 | Shore | G11B 27/034 | 348/239 |
| 6,452,612 B1 * | 9/2002 | Holtz | G06F 3/1431 | 348/722 |
| 7,324,166 B1 * | 1/2008 | Joslin | H04N 9/75 | 348/578 |
| 7,427,988 B2 * | 9/2008 | Vienneau | G06T 13/00 | 345/473 |
| 7,525,601 B2 * | 4/2009 | Sugimoto | H04N 5/262 | 348/578 |
| 7,649,573 B2 * | 1/2010 | Casper | G11B 27/034 | 348/722 |
| 7,903,903 B1 | 3/2011 | Acker et al. | | |
| 8,013,940 B2 * | 9/2011 | Ciccotti | H04N 5/222 | 348/586 |
| 8,407,374 B2 * | 3/2013 | Ross | G11B 27/034 | 340/2.28 |
| 8,484,679 B1 * | 7/2013 | Chtchedrina | H04N 21/8541 | 725/37 |
| 8,547,414 B2 * | 10/2013 | Sheeley | G06F 3/0416 | 345/173 |
| 8,736,765 B2 * | 5/2014 | Casper | H04N 5/268 | 348/565 |
| 2003/0149725 A1 * | 8/2003 | Worthen | G06Q 10/10 | 709/204 |
| 2004/0029525 A1 * | 2/2004 | Vertelney | H04H 20/57 | 455/3.03 |
| 2005/0223333 A1 * | 10/2005 | Yamamoto | G06F 3/04845 | 715/765 |
| 2007/0182864 A1 | 8/2007 | Stoneham et al. | | |
| 2008/0012988 A1 * | 1/2008 | Baharav | H04N 5/2723 | 348/586 |
| 2009/0128306 A1 * | 5/2009 | Luden | G06F 3/016 | 340/407.1 |
| 2010/0223392 A1 * | 9/2010 | Pond | H04N 21/23424 | 709/231 |
| 2011/0080356 A1 * | 4/2011 | Kang | G06F 3/0486 | 345/173 |
| 2013/0035856 A1 * | 2/2013 | Connors | G06F 8/60 | 701/484 |

* cited by examiner

HARD KEY CONTROL PANEL FOR A VIDEO PROCESSING APPARATUS AND VIDEO PROCESSING SYSTEM

FIELD OF THE INVENTION

The present invention is related to a hard key control panel for controlling a video/audio processing apparatus and a video processing system including the hard key control panel.

BACKGROUND

Live video productions such as TV productions are realized today using vision mixers. Vision mixers are commercially available e.g. from the companies Grass Valley, Sony, Snell, and Ross.

A vision mixer is a device used to select between different video input signals to generate a video output signal. Besides creating different kinds of transitions the vision mixer can generate a multitude of video effects and comprises keyers, matte generators, text generators etc. By means of the vision mixer the user also controls the routing of signals from various sources to selectable destinations.

The vision mixer also performs the routing and switching of audio signals accompanying the video signals. However, since the processing of video signals is more complex than the processing of audio signals the present patent application is focused on the video signal. It is to be understood that in the context of the present patent application the processing of the video signal also implies a corresponding processing of an accompanying audio signal. Only for the sake of better intelligibility of the description of embodiments of the present invention audio signals are not always mentioned in addition to the video signals.

In order to enable a multitude of functionalities, vision mixers consist of a huge amount of hardware components to process the video signals. The processing hardware components are located in one housing and are connected with local bus solutions in order to control all video processing hardware in real-time to meet the fast control requirements of live productions.

A conventional vision mixer comprises a central mixing electronic, several input channels and at least one output channel, a control unit and a user interface. Such kind of vision mixer is described for example in DE 103 36 214 A1.

Live video productions like news, sports and stage events are produced in fixed or mobile TV studios. Conventionally, a TV studio is equipped with a vision mixer, multi-viewer and monitor walls, storage systems and digital video effects devices, external crossbars and the like. All these devices consist of a big amount of dedicated hardware stages, external cabling and specific configurations settings reflecting the internal and external hardware structure and connectivity. The entire TV live production is controlled by operating a control unit controlling the devices. For historical and architectural reasons the operation and configurations of the control interface for these devices is hardware oriented. For this reason the operator of the TV live production has to keep simultaneously in mind two completely different views on a TV production, namely the sequence of the scenes of the TV production on the one hand and the hardware operations required for obtaining the desired workflow of the scenes. These two different views on the same live TV production have nothing to do with each other. Therefore, the task of operating a live TV production is complicated. But it is made even more complicated due to the fact that the operator can influence almost all hardware components. Consequently, there is a significant risk to execute mal-functions such as losing an input signal which is required for a scene which is currently on-air. At the same time, the operator cannot access all functionalities needed for the workflow of the scenes without setting certain delegation levels.

Existing operating interfaces for conventional TV live production systems are inflexible because they are tied to the underlying hardware of the devices used for a TV production. This makes them also very complicated and their operation is frequently counter intuitive. As such TV live productions are error prone unless special efforts are made to support the operator.

SUMMARY OF THE INVENTION

Obviously there is a need for improving the operating interface for live TV productions. Therefore, the present invention suggests a hardware control panel enabling the user, typically the director of a live TV show, in a manner which reflects the flow of the different scenes in the live production. Specifically, the present invention suggests a hard key control panel.

The control panel according to the invention comprises a plurality of hard key control elements which are arranged in different groups. A first group of control elements is assigned to select a predefined scene for being broadcasted. A second group of control elements is assigned to select signals for a currently broadcasted scene being composed of several input signals including camera signals. A third group of control elements is assigned to select signals for a next scene which is selectable for being broadcasted by operating a control element of the first group. The control panel of the present invention enables the production director to control a live video production in an intuitive way.

Advantageously, the hardware control panel provides an operating interface that matches with the workflow of TV productions. It enables context related direct access to all functionalities which are needed during the TV show. However, it does not provide direct access to those functionalities which are not needed in a specific scene. Hence, it significantly reduces or even prevents malfunctions during a TV production.

According to an embodiment of the present invention the panel comprises a fourth group of control elements assigned to scenes and signals remaining in stand-by for future use. The signals include camera signals.

Advantageously each group of control elements is illuminated in a different colour to indicate to which group they pertain and their different functionality to the user. In this case the control elements can be illuminated pushbuttons enabling illumination in different colours.

In an embodiment of the invention the control panel is communicatively connected with a graphical user interface to control functions assigned to the control panel.

According to an embodiment the control panel is communicatively connected with a graphical user interface and a pointing device. A pointer associated with the pointing device is controllable by means of the pointing device to be either displayed as graphical element in the graphical user interface or as highlighted hard key element on the control panel. This embodiment enables to control the control panel in the same way as the graphical user interface by means of the pointing device. In this case it is particularly advantageous to enable the pointing device to control functionalities assigned to the highlighted hard key element. This provides for additional flexibility of the control panel. The hard key element can be a hard key control element or a display.

According to a variant of the control panel the pointing device is a computer mouse movable on a mouse pad. The computer mouse is effective to display a graphic element on the graphical user interface when the mouse is situated in a first area on the mouse pad. The computer mouse is effective to highlight a button on the control panel if the computer mouse is situated in a second area of the mouse pad. The same computer mouse enables influencing the graphical user interface and the control panel. It has been found to useful if the hard key element is highlighted by at least one of a distinctive colour, a distinctive icon, a distinctive shape, a distinctive text size, and a distinctive text font.

In a further embodiment of the invention the control panel is communicatively connected with a graphical user interface to assign the control elements of the control panel to the different groups. This feature increases the flexibility of the control panel and it can be adapted to the needs for a specific live production.

In an advantageous embodiment the first group of control elements comprises a dedicated control element which puts a signal prepared in the fourth group on-air or into the status of a next on-air signal.

It has been found useful if each group of control elements is associated with a dedicated display. In this case it is advantageous if the dedicated display is adapted for being illuminated in different colours.

In an embodiment of the invention the control element(s) are hard key button(s). More specifically, the buttons can be illuminated pushbuttons enabling illumination in different colours to further increase the usability of the control panel.

According to another aspect the invention relates to a video processing system. According to an embodiment, the video processing system includes at least one video processing unit and a control panel for controlling the at least one video processing unit.

DRAWINGS

Figure 2:
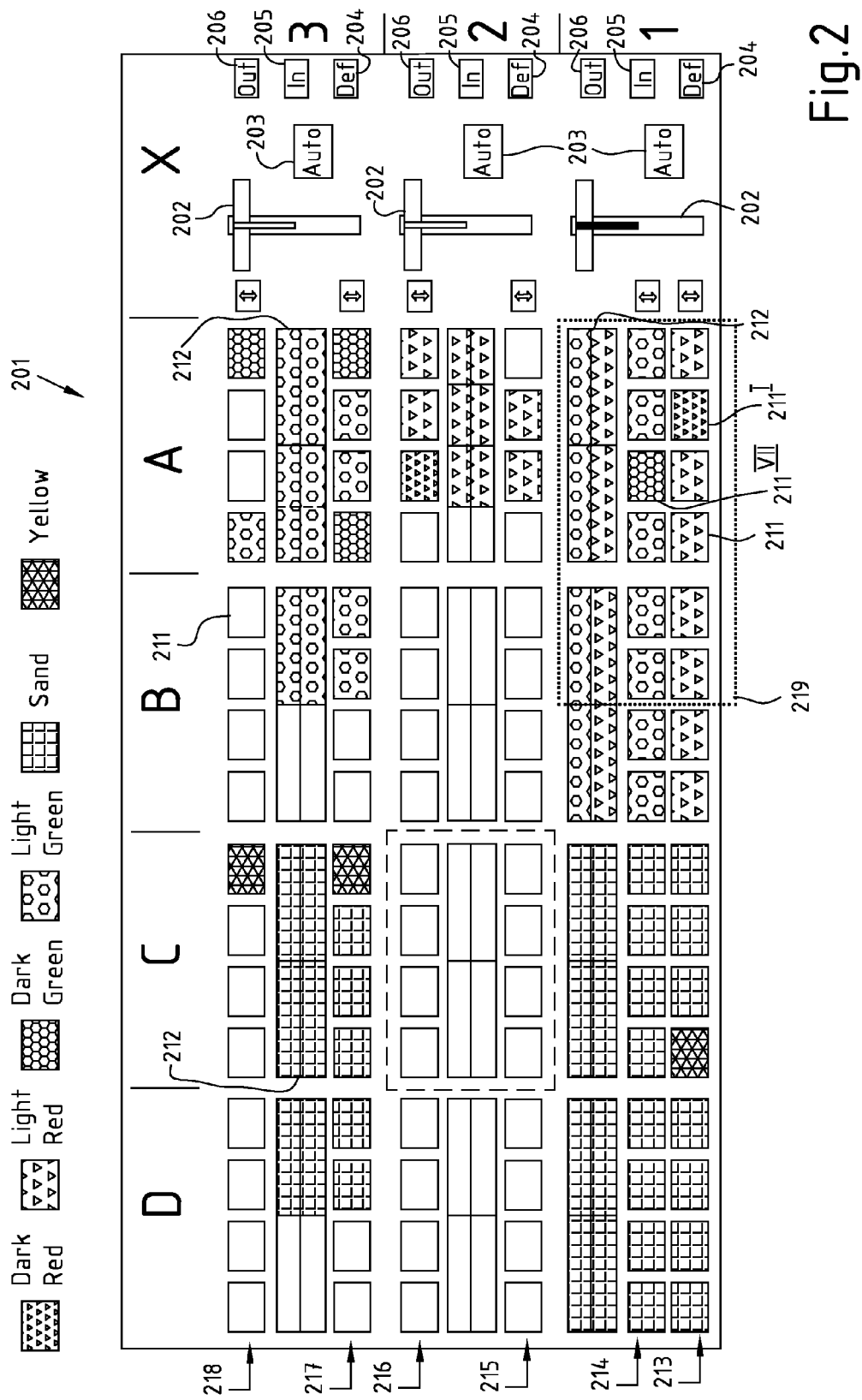
Figure 3:
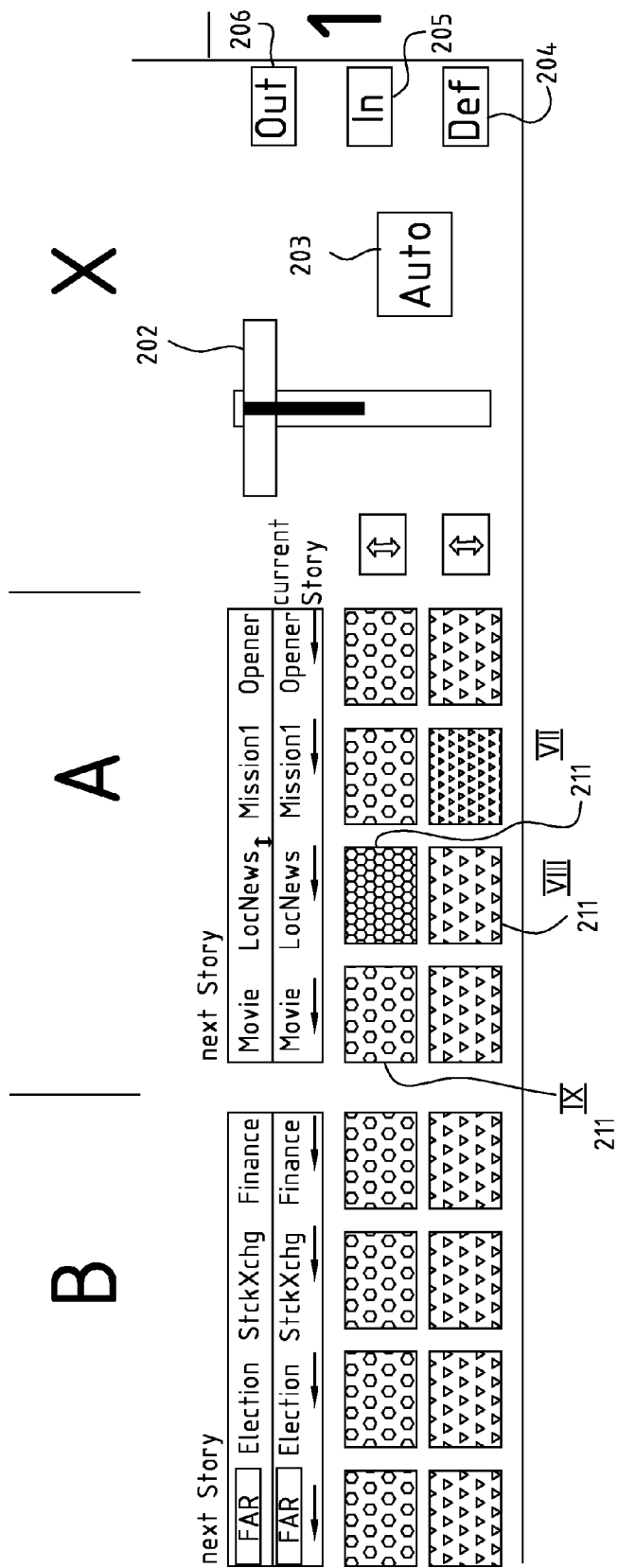
Figure 4:
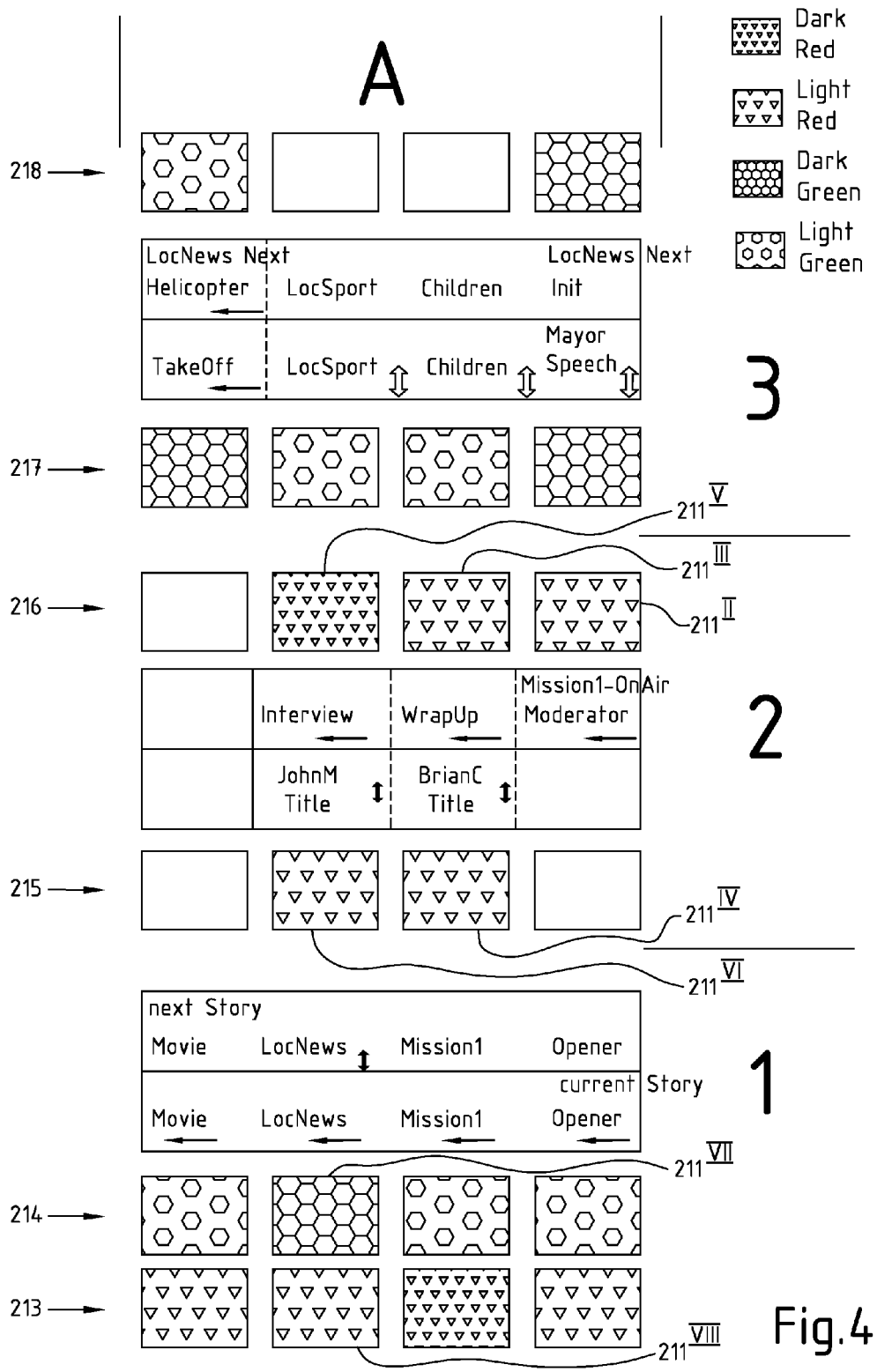
Figure 5:
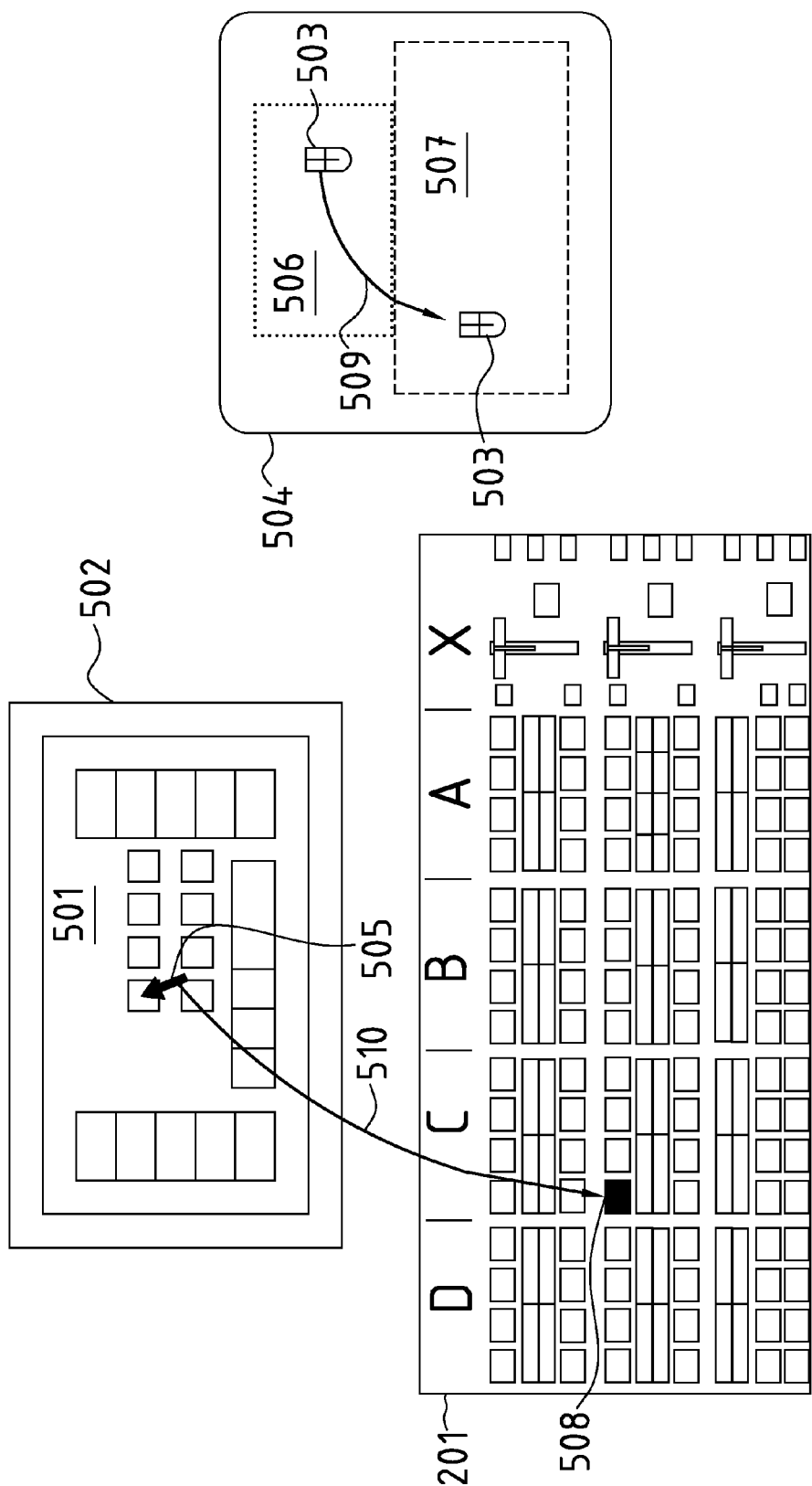
Figure 6:
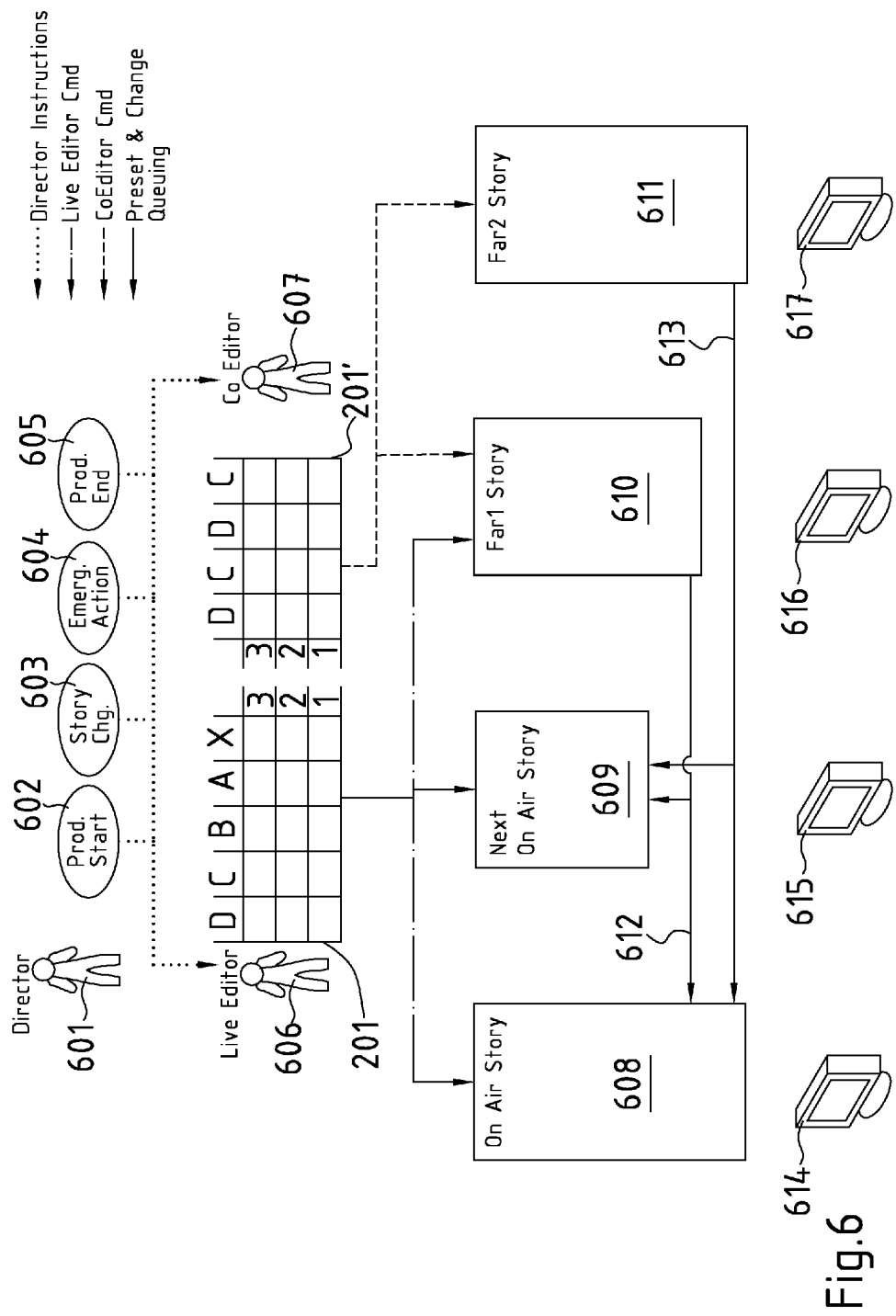
Figure 7A:
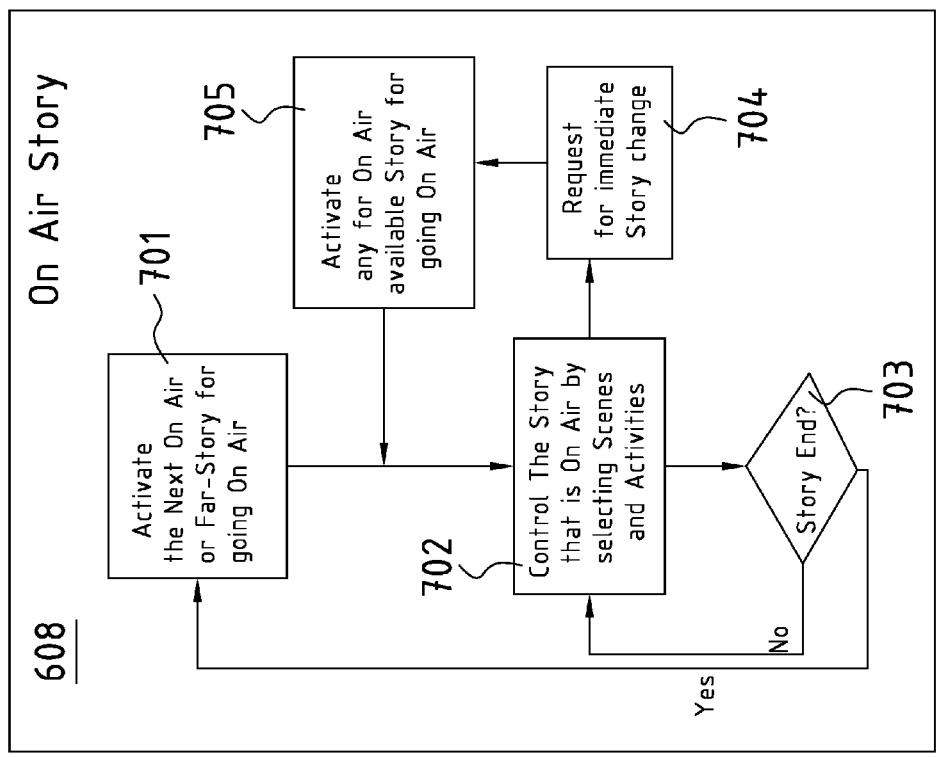
Figure 7B:
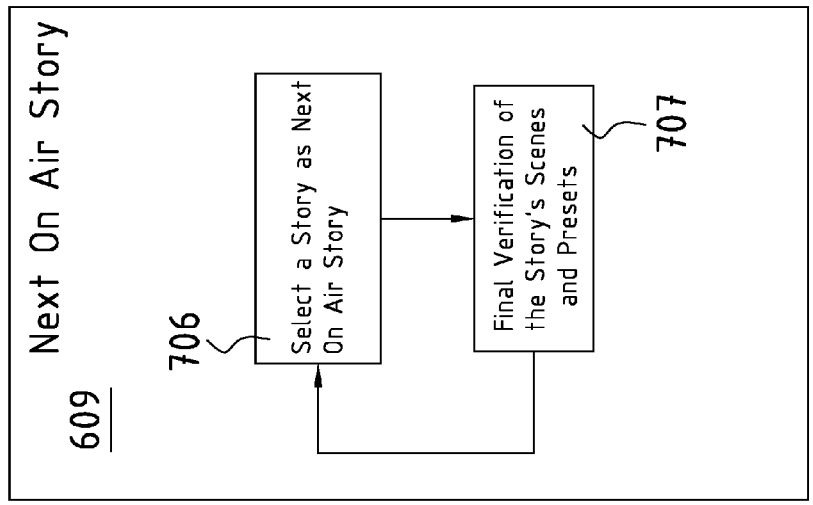

In the drawing an embodiment of the present invention is illustrated. Features which are the same in the figures are labeled with the same or a similar reference numbers. It shows:

FIG. 1 a schematic block diagram of a system for video processing which is operated by a method according to the present invention;

FIG. 2 a schematic layout of the control panel according to the present invention;

FIGS. 3 and 4 are enlarged portions of the control panel shown in FIG. 2;

FIG. 5 the control panel connected with a graphical user interface;

FIG. 6 is a schematic diagram illustrating the workflow of a TV production utilizing the present invention;

FIGS. 7A and 7B a portion of FIG. 6; and

Figure 8B:
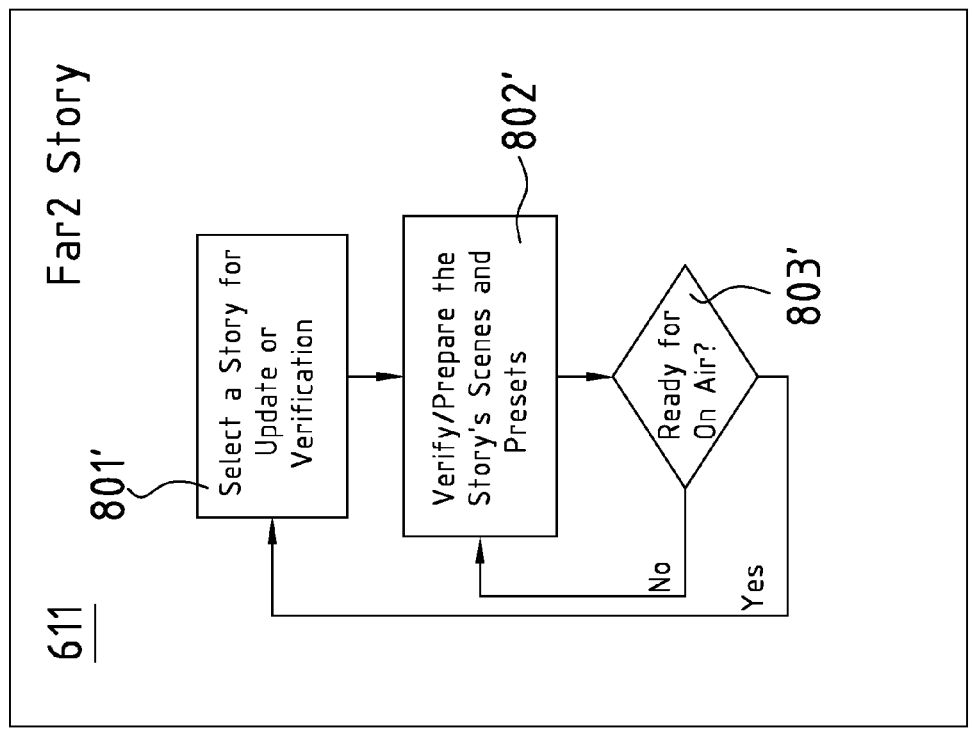
Figure 8A:
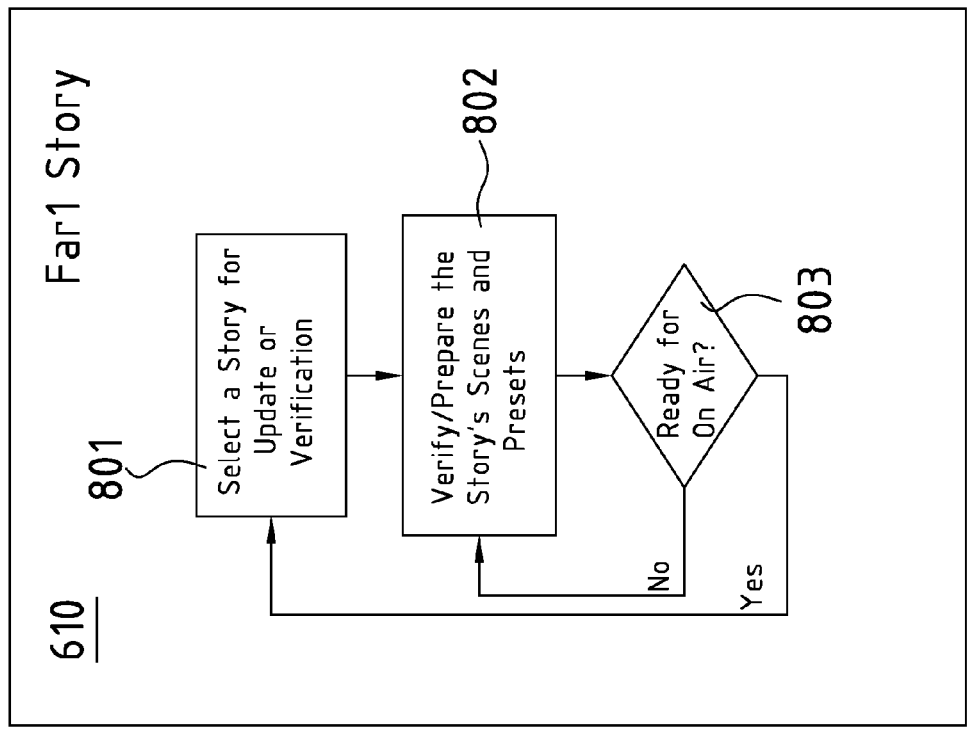

FIGS. 8A and 8B another portion of FIG. 6.

DETAILED DESCRIPTION

FIG. 1 shows a schematic block diagram of the architecture of an alternative system for processing video and/or audio signals which has been described in detail in the European patent application EP12175474.1 filed by the same applicant. The proposed architecture of the inventive system allows building the hardware platform on standardized IT technology components such as servers, graphical processing units (GPU) and high-speed data links. Typically, these standardized IT components are less costly than dedicated broadcast equipment components. Besides the cost advantage the proposed system benefits automatically from technological progress in the area of the above-mentioned IT components. In the proposed system video processing hardware is split into smaller and flexible video processing units and combines dedicated control, video and audio interconnections into one logical data link between the individual processing units. The data links are designed such that they have a reliable and constant time relation. The data links are typically based on a reliable bidirectional high-speed data connection such as LAN or WAN. The individual processing units work independently as fast as possible to achieve or even exceed real-time processing behavior. Normally, real-time processing means that the processing is finished until the next video frame arrives. Therefore, the term "real-time" is a relative term and depends on the video frame rate. The system ensures that overall production real-time behavior with simultaneous processing is achieved and generates a consistent production signal PGM-OUT. This general concept is described in greater detail in the following.

In the video processing system shown in FIG. 1, the video processing hardware is organized in processing units 101, 103, 105, and 107 according to the geographical distribution of a production i.e. according to the geographical distribution of the resources enabling the production as it is shown schematically in FIG. 1. The technical core of each processing unit is a server, one or several graphics processing units (GPUs) and high-speed data links operated by a processing application framework and dedicated algorithms. The processing application framework and the algorithms are realized in software. The algorithms are adaptable and extendable to also realize further functionalities going beyond the functionalities of conventional vision mixers. The video signals are processed by GPUs in commercially available graphic cards. Hence, conventional video processing by dedicated hardware is replaced by software running on standardized IT components. All the processing capabilities of the GPUs are available and enable new video effects.

The operator controls the whole production as if it was at one single production site in a single production unit next to the control room. The entire production process is moved from dedicated video/audio and control routing to common data links. The individual wiring hardware such as SDI connections is replaced by standardized data networks. The routing of all signals in the data networks is bidirectional and the production output and monitoring signals like dedicated multi-view outputs can be routed to any production unit which is connected in the network without extra cabling expenses.

High-speed data networks are more and more available not only in video production sites such as film or TV studios but also in wide area distribution networks, e.g. multiple of 10 G Ethernet or Infiniband.

In studios, professional video networking means that the video content is transferred uncompressed. For HDTV formats 1080i/720p data rates of 1.5 Gbit/s are resulting in studio environment where uncompressed audio and video data are used. For HD format 1080p a net data rate of even 3.0 Gbit/s results.

Referring back to FIG. 1 every block represents one of the distributed processing units belonging to the system which is referred to in its entirety with reference number 100. In the exemplary embodiment shown in FIG. 1 processing unit 101 is located in a football stadium in Frankfurt. Processing unit 101 receives as local sources 102 camera signals from the stadium, slow-motion video from a local slow-motion server and eventually audio and video signals from an interview taking place locally. Processing unit 103 is also located in Frankfurt but not necessarily in the same place as processing unit 101. Processing unit 103 receives camera signals as local sources 104 from a live presenter in an interview room. Processing unit 105 is located in Berlin and represents the main processing room providing additional processing power for the ongoing production as well as access to archives and servers where for example advertisement clips are stored. The archives and the servers are indicated as local sources 106. The local sources 102, 104, and 106 provide the video and/or audio signals as SDI or streaming data. Finally, there is a processing unit 107 which represents the live control unit (LCU) located in Munich from where the live production is controlled and monitored. The production result is leaving processing units 103 and 105 as video and audio output signals PGM-OUT 108 and 109 for being broadcasted. The processing units 101, 103, 105, and 107 are interconnected with each other with reliable bidirectional high-speed data links 110 as shown in FIG. 1. The data links 110 enable communication between the processing units 101, 103, 105, and 107 and provide constant and known signal delays between the production units. It is noted that the high-speed data links 110 represent logical data links which are independent of a specific hardware realization. For example, the data links 110 can be realized with a set of several cables. In the situation shown in FIG. 1 the data links 110 are an Internet protocol (IP) wide area network (WAN). In a WAN special measures have to be taken to make sure that the data packages are received in the same sequence as they have been sent over the network to meet the requirements of video processing. Appropriate measures can be taken on the protocol and/or hardware level of the network such that the system behaves like a single big vision mixer.

The present invention suggests a hard key panel concept which supports the production director in the LCU (live control unit) 107 in Munich to control and monitor the TV production. The inventive control panel relieves the production director to a large extent of hardware operations and allows him focusing more on the workflow which will be explained in further detail below.

TV productions like news, sports, stage shows contain a lot of stories having a well-defined unique appearance of the specific production. E.g. a news production always follows the same structure though it may vary from broadcaster to broadcaster. Typically, there is an opening by the moderator, contributions about national and international politics, and the weather forecast. These parts of the news production are called "stories" comprising several scenes. There may be 5 to 100 stories in a show or news production and there are 5 to 10 scene templates which define the appearance of the production. The production director uses the scene templates and fills them with the story composed of several scenes, e. g. the moderator presents his opening. A filled scene template is an executable scene for the TV production.

Taking these scene templates and filling it with the story finally provides executable scenes for the news production. Sequencing executable scenes and controlling dedicated scene transitions is finally under the control of the live production director.

Transferring this concept from a live video production into the area of a graphical slide presentation may help to illustrate the new concept of the present invention even better. The slide presentation of the quarterly report of a company corresponds to the video production of a news production. Like a news production the quarterly report always follows the same structure namely the course of business in the last year, the evolution of headcount, income and spending and finally it provides an outlook into the next year. The templates for the slides are fixed and do not change. However, the content of the slides changes and reflects the evolution of the company from one reporting period to the next one. The creator of such a presentation does not prepare the slides each time from scratch but rather uses the predefined templates and fills them with updated contents to generate an "executable slide" for the presentation. The presenter controls when the next content is shown within one template and when the next template is called up.

In the context of the present patent application a scene is a predefined composition of video layers in front of a video background. A scene is used to tell the viewer a portion of a story in the way the director has conceived it. Typically, the evolution of the story is a sequence of scenes. While a story evolves, audio and video sources used in a scene can change; the scene can change its layout, size and appearance; video layers can be added or removed. All this is under the control of the production director. If a new story begins within a TV production, normally a new scene is executed.

The present invention builds on this general concept and suggests a hard key control panel supporting TV production directors to operate real-time TV productions. A key point of the present invention is to suggest a hard key control panel enabling mapping of the described scene oriented operating philosophy onto a hard key control panel.

FIG. 2 shows a top view on an embodiment of the hard key control panel 201 according to the present invention. The elements of the hard key control panel 201, or briefly control panel, are arranged in a plurality of blocks having a matrix type structure with columns and rows. The columns are labeled with letters D, C, B, A, X from left to right and the rows are labeled 1, 2, and 3 from bottom to top. The blocks in the different matrix rows are assigned with different functionalities and, therefore, matrix row 1 is also called story level 1, matrix row 2 is called on-air level 2, and matrix row 3 is called next scene level 3. The functionalities of the levels 1, 2, and 3 will be described in greater detail further below.

The different blocks of the control panel 201 will be described by making reference to the column and row where the block is located in the matrix shown in FIG. 2. The blocks having a similar functionality will be described together.

The blocks are identified according to the following convention: Block A on level 1 is identified as 1-A. Several blocks on several levels in the same column are identified by the relevant level numbers separated by a comma and the letter identifying the row where the blocks are located, e.g. 1,2,3-A. Similarly, several blocks in several rows on a single level are identified with the level number where the blocks are located and the letters identifying the relevant rows separated by a comma, e.g. 1-A,B.

Blocks 1,2,3-X are used to make transitions between two signals either manually controlled with an effect lever 202 or automatically executed. The automatic execution is initiated when the operator pushes a button "Auto" 203. A default button "Def" 204 allows the operator to select which kind of transition (horizontal or vertical fade, swirl effect, etc.) is used as a default. By operating buttons "In" and "Out" 205, 206 the operator selects the transition for the entry into a new story and for the exit from a current story. Frequently, the transition into a new story and out of the current story is different and part of the "look and feel" of a specific TV production. The functionalities of the blocks 2-X and 3-X are in principle the same as of the block 1-X though on different levels of the live production.

In the area of columns A to D of the control panel 201 each block is composed of eight pushbuttons 211 and an associated display 212. As an example block 2-C is framed with a dashed line in FIG. 2. However, it is noted that the layout of the control panel 201 shown in FIG. 2 is only an example and the present invention is not limited to a particular layout. E.g. in another embodiment of the control panel 201, each of the before mentioned blocks comprises three rows of buttons 211 and one associated display 212. Also, the control panel 201 is configurable that each block has less or more than four buttons in a row following the format of the live production. In FIG. 2 the block 219 having six buttons in rows 213, 214 is indicated with a dotted line. However, for the sake of simplicity the following description shall be based on the principle layout shown in FIG. 2 (two rows of four buttons, one display) without limiting the scope of the present invention.

In blocks 1-A,B there are two rows of pushbuttons 211 and the associated display 212. For the sake of clarity each row of buttons 211 in the control panel is labeled with reference numbers from 213 to 218. Row 213 of buttons 211 of blocks 1-A,B puts a signal on-air when the attributed button is activated. For this reason row 213 in blocks 1-A,B is also called the "program row". In the situation shown in FIG. 2 the signal associated with button $211^1$ is currently on-air. If another button in row 213 is pushed then the signal associated with this other button is put on-air which means it is immediately broadcasted.

With buttons 211 in row 214 of blocks 1-A,B the next story to be put on-air is selected. Therefore, row 214 in blocks 1-A,B is called the "preset row". When the operator or editor selects a scene by activating an associated button $211^{VII}$, then the scene is displayed on a monitor 615 (FIG. 6) and can be checked and verified by the operator as it will be explained in greater detail with reference to FIGS. 6 and 7. The selection of the signal in the preset row 214 has further consequences, namely, the selected source signals from cameras, hard disc recorders etc. are made available and are locked for other users like a coeditor 607 (FIG. 6). E.g. the camera man is informed by a yellow tally light that his camera has been selected for the next scene and it is going on-air soon. The signals from cameras are live signals.

The buttons 211 of the control panel 201 are illuminated in different colors, also called "tally colors" or "tally lights", to inform the user about their functionality. The tally lights have the advantage that the operator can immediately recognize the underlying functionality of the specific button without having to read an alphanumeric display. For formal reasons the different tally colors of the buttons are symbolized by different patterns in FIG. 2. E.g. the button $211^I$ in program row 213 is illuminated in dark red colour to indicate the on-air signal. Likewise the effect lever 202 is illuminated in red color (indicated by a dark vertical bar versus a light vertical bar in effect levers 202 on levels 2 and 3) for the same reason.

FIG. 3 shows an enlarged view of blocks 1-A,B,X in which also the labels of the displays 212 are visible. The displays 212 in blocks 1-A,B show from right to left seven stories forming the live video production. The stories are labeled "Opener", "Mission1", "LocNews" for local news, "Movie", "Finance", "StkXChg" for stock exchange, and "Election". Each of the seven stories is linked with specific scene template which is used for the story. It is to be noted that display sections are illuminated with a tally light too but this cannot be shown in FIG. 3.

The composition of the scene which is currently on-air is controlled in block 2-A (block 2-B remains idle) which is shown in greater detail in FIG. 4. The story "Mission1" is currently on-air. The story has an opener which shows the moderator in a first setting. Button $211^{II}$ in row 216 is activated (FIG. 4). Then the wrap-up is provided by a reporter and button $211^{III}$ is activated. During the wrap-up the name of the reporter, here "Brian C", is inserted by activating button $211^{IV}$. It follows an interview by activating button $211^V$ and the name of the interviewed person is inserted temporarily by activating button $211^{VI}$. Finally, at the end of the story "Mission1" the moderator makes some closing remarks. For this purpose the operator activates again button $211^{II}$. Hence, the story "Mission1" is composed of several scenes which use predefined scene templates and input signals including camera signals which are live signals. As mentioned before, the production director controls the evolution of the story simply by activating the buttons 211.

After the story "Mission1" is finished, the operator starts the next story "LocNews" the first scene of which is already prepared in block 3-A,B (FIGS. 2 and 4) which is indicated by the darker green tally light of button $211^{VII}$ (FIG. 4). The operator puts the story "LocNews" on-air by simply activating the button $211^{VIII}$. At this moment the tally light of button $211^{VIII}$ turns from light red into dark red. At the same time the current setting of blocks 3-A,B replaces the setting of blocks 2-A,B and a new next scene ("Movie") is prepared in blocks 3-A,B by pushing button $211^{IX}$ (FIG. 3). The transition by pushing the button $211^{VIII}$ is a hard cut from "Mission1" to "LocNews". However, the editor or operator can execute the transition also by moving the effect lever 202 or by activating the auto button 203 on level 1. The latter initiates an automatic transition.

In this way, the production director controls the live TV production in an intuitive way and can completely focus on the story without being bothered by directly operating hardware components. Another advantage is that the production director is prevented from making malfunctions because he directs the story within predefined scene templates which by default cannot be changed during the live production.

In some types of productions like a news production following a script, normally each story with its associated scenes is shown only once. Therefore, in an embodiment of the present invention the story assignment displayed on the displays 212 in blocks 1-A,B is shifted one by one from left to right each time a story is terminated.

The blocks 1-A,B; 2-A,B; and 3-A,B are connected with multi-viewers providing a complete overview of the input signals and the resulting output signals after processing. It is noted that the output signals which are only displayed on a multi-viewer are not necessarily calculated in full resolution by the processing unit 107 to save processing power. Only the on-air signals have to be calculated by the processing unit 107 in full broadcast quality. The processing unit 107 is taken only as an example and the same applies of course to any other processing unit in the audio and video processing system.

Blocks 1,2,3-C,D (FIG. 2) are a working area which is used to support a live video production by preparing and verifying scenes to be put on-air. The use of the different parts of the control panel 201 will be explained in further detail with reference to FIGS. 6 to 8. The blocks 1,2,3-C,D are also connected to a multi-viewer.

The different functionalities of the different blocks of the control panel 201 shown in FIG. 2 are described in connection with a specific position of the respective blocks in the control panel. However, it is to be noted that advantageously the control panel 201 is adaptable so that a certain functionality of a specific block is assignable to any block in the control panel since the physical structure of each block is the same, namely eight buttons 211 and one display 212.

FIG. 5 shows a graphical user interface (GUI) 501 displayed on a monitor 502. The graphical user interface 501 is communicatively connected with the control panel 201. The graphical user interface 501 enables the operator to control functionalities 501 of the video processing by means of a pointing device such as a mouse 503 shown in FIG. 5. The position of the mouse 503 on a mouse pad 504 corresponds to the position of the graphical pointer 505 displayed on the monitor 502 as it is known from conventional computer applications. When the operator moves the mouse 503 in an area 506 indicated with a dotted line on the mouse pad 504, the pointer 505 moves on the monitor 502 in the area where the graphical user interface 501 is displayed. However, when the operator moves the mouse 503 beyond the area of 506 into area 507 indicated with a dashed line on the mouse pad 504, then the pointer 505 disappears on the monitor 502 and a button 508 on the control panel 201 is highlighted. The highlight is for example an increased illumination level of the button 508 or its illumination in a different color. The position of the button 508 corresponds to the position of the mouse 503 in the area 507 on the mouse pad 504. The transition of the pointer 505 from the graphical user interface 501 to become a highlighted button 508 on the control panel 201 is comparable with the commonly known transition of a cursor from a first monitor to a second monitor when both monitors are connected with the same computer.

In the same way as it is described with reference to the highlighted button 508 also a display on the control panel 201 can be highlighted. The highlighting is achieved by the distinctive color, icon, text size or text font.

The movement of the mouse 503 on the mouse pad 504 is illustrated with an arrow 509. The corresponding movement of the pointer 505 across the graphical user interface 501 and its transition into the highlighted button 508 on the control panel 201 is symbolized by an arrow 510. In this setup the operator can execute various kinds of commands with left and right mouse clicks, turning a mouse wheel etc. including drag and drop functions. By using the functionalities provided by the mouse 503 the operator can also adapt the functionalities of the control panel 201 by changing the underlying software of the control panel. E.g. the graphical user interface 501 comprises widgets allowing the operator of the system to reassign functionalities of the blocks of the control panel 201. In consequence, the functionalities of the hard key control panel 201 are adaptable in a similar way as a graphical user interface. In FIG. 5 the mouse 503 is only shown as an example for all kinds of other pointing devices such as a trackball, graphics tablet, joystick, keyboard etc.

In another embodiment of the present invention also the physical layout is different. In this embodiment which is not shown in the drawing, the rows C and D are arranged on the right side of column X, such that the sequence of the columns is B, A, X, C, D when using the denomination of the columns defined in FIG. 2. In yet another embodiment of the present invention the control panel 201 shown in FIG. 2 is composed of two separate hardware devices. The first device comprises columns B, A, and X and the second device comprises columns C, D. The two devices are connectable such that in response to the need of the operator the second device can be connected to the left or to the right side of the first device. In the first alternative the sequence of the columns is D, C, B, A, X and in the second alternative the sequence of the columns is B, A, X, D, C. In further embodiments of the invention more than two such hardware devices are used in the live production as it is shown with the reference to FIG. 6 and described further below.

FIG. 6 illustrates in a symbolic way the production process including the people involved and their interactions with the production equipment, in particular with the control panel 201. The production director 601 (or briefly: director) directs the production by issuing director instructions including "production start" 602 and "story change" 603. During the course of the production the director 601 can take an "emergency action" 604 to respond to an unforeseen incident like the sudden end of a conference, the arrival of a politician or a movie star, a foul in a football match etc. Finally, the director terminates the production by issuing a "production end" instruction 605. The instructions of the director 601 are executed by a live editor 606 and a co-editor 607 who control the control panel 201 which is symbolized in FIG. 6 only by its matrix structure. The responsibility of the live editor 606 mainly is to control the on-air story 608 and the next on-air story 609. The live editor executes his task by operating the columns A, B, and X of the control panel 201. If the workload determined by the dynamics of the video production permits, the live editor 606 may also take care of Far1 Story 610. However, this is not always possible during live productions. This is the reason why the co-editor 607 is present as well who mainly is responsible to prepare the Far1 Story 610 and a Far2 Story 611. Far1 and Far2 stories 610 and 611 are both still in preparation for going on-air at a later point in time. For preparing the Far1 Story 610 and the Far2 Story 611 the co-editor 607 controls columns C and D of the control panel 201. The co-editor 607 works on his own control panel 201' which is set up such that it includes only two times columns C and D because the co-editor 607 has no responsibility for the on-air story 608 and the next on-air story 609 controlled by the live editor 606 by means of columns A, B, and X of the control panel 201. The Far1 Story 610 as well as the Far2 Story 611 can replace the next on-air story 609 or the on-air story 608. This is illustrated by arrows 612 and 613, respectively. Thus, the arrows 612 and 613 indicate a preset and change queuing of the production. Director 601, live editor 606 and co-editor 607 can monitor the signals of the on-air story 608, next on-air story 609, Far1 Story 610, and Far2 Story 611 on associated multi-viewer monitors 614 to 617, respectively. The multi-viewer monitors 614 to 617 permit not only monitoring in real time the selection of signals, which may include live signals, but also the live composition of the scenes with their dynamic changes and effects that are applied. It is noted that there can be more than two stories in preparation or only one. Far1 story 610 and Far2 story 611 are used only as illustrative example. Similarly, it is not fixed which person works on the preparation of the Far1 and Far2 story. The invention is completely flexible in this regard.

The work of the live editor 606 related to the on-air story 608 is illustrated in greater detail in FIG. 7A. In a first step 701 the live editor 606 activates the next on-air or Far1 or Far2 Story for going on-air. The live editor then controls the story which is on-air by selecting scenes and activities in step 702. He continues to do so until the on-air story reaches its end which triggers in step 703 the decision of the live editor 606 to continue to control the on-air story by returning to step 702 or to activate the next story for going on-air by returning to step 701. If an unforeseen incident requires immediate reaction there is a request for an immediate story change in step 704. In response to the request in step 704 a story which is available for going on-air is activated in step 705.

The preparation of the next on-air story 609 by the live editor 606 is shown in FIG. 7B. It only requires to select the story in step 706 and to verify in step 707 the scenes and presets of the story.

As mentioned before the live editor 606 may have sufficient time to prepare the Far1 Story. However, the working process for preparing the Far1 Story 610 will be described only in connection with the work of the co-editor 607 which is illustrated in connection with FIGS. 8A and 8B. The necessary steps for preparing the Far1 Story are the same for the live editor 606 and for the co-editor 607.

FIG. 8A illustrates in a flow diagram the steps for preparing the Far1 Story 610. In a first step 801 the co-editor 607 selects the story for update or verification. An update may be necessary if the situation has changed during the course of the live production e.g. a politician has started to give interviews after a conference. Then, the co-editor 607 verifies and prepares the scenes and presets of the Far1 story in step 802. In step 803 he decides if the story is ready for going on air or not. If it is not ready for going on air the co-editor 607 continues with step 802. If the story is ready for going on air it is shifted into the block 3-A (FIGS. 2 and 4) of the next on-air story as soon as the current next on-air story actually went on-air.

Depending on the video production and the available resources the co-editor 607 is enabled to prepare a Far2 Story 611. The working process is the same as for preparing the Far1 Story 610 and is shown in FIG. 8B.

During the course of the video production the currently on-air story 608 is replaced at a certain point in time by the next on-air story. At the same time one of the prepared stories 610 or 611 becomes the next on-air story. In this way the live editor 606 and co-editor 607 can sequentially prepare and control the live video production.

| List of reference numbers | |
|---|---|
| 100 | processing system |
| 101 | processing unit |
| 102 | external sources |
| 103 | processing unit |
| 104 | external sources |
| 105 | processing unit |
| 106 | local sources |
| 107 | processing unit |
| 108, 109 | output signals |
| 110 | data links |
| 201 | control panel |
| 202 | effect lever |
| 203 | Auto button |
| 204 | default button |
| 205 | in button |
| 206 | out button |
| 211 | push button |
| 212 | associated display |
| 213-218 | rows of buttons |
| 219 | block |
| 501 | graphical user interface |
| 502 | monitor |
| 503 | mouse |
| 504 | mousepad |
| 505 | graphical pointer |
| 506, 507 | areas on the mousepad |
| 508 | button |
| 509, 510 | arrow |
| 601 | production director |

-continued

| List of reference numbers | |
|---|---|
| 602 | production start |
| 603 | story change |
| 604 | emergency action |
| 605 | production and |
| 606 | live editor |
| 607 | co-editor |
| 608 | on air story |
| 609 | next on air story |
| 610 | Far1 Story |
| 611 | Far2 Story |
| 612, 613 | arrows |
| 614 to 617 | multi-viewer monitor |
| 701 to 707 | process steps |
| 801 to 803 | process steps |
| 801' to 803' | process steps |

The invention claimed is:

1. Control panel for controlling a video and/or audio processing apparatus, wherein the control panel comprises a plurality of hard key control elements which are arranged in different groups,
wherein a first group of control elements is assigned to select a predefined story for being broadcasted;
wherein a second group of control elements is assigned to select signals and scenes for a currently broadcasted story, the scenes being composed of several input signals including camera signals;
wherein a third group of control elements is assigned to select signals and scenes for a next story which is selectable for being broadcasted by operating a control element of the first group; and
wherein when next story on-air by activation of a control element of the first group, the current settings of the third group replace the settings of the second group.

2. The control panel according to claim 1, wherein the control panel comprises a fourth group of control elements assigned to scenes and signals including camera signals remaining in stand-by for future use.

3. The control panel according to claim 1, wherein each group of control elements is illuminated in a different colour to indicate to which group they pertain and their different functionality to the user.

4. The control panel according to claim 1, wherein the control panel is communicatively connected with a graphical user interface to control functions assigned to the control panel.

5. The control panel according to claim 1, wherein the control panel is communicatively connected with a graphical user interface and a pointing device, wherein a pointer associated with the pointing device is controllable by means of the pointing device to be either displayed as graphical element in the graphical user interface or as highlighted hard key element on the control panel.

6. The control panel according to claim 5, wherein the pointing device is a computer mouse movable on a mouse pad, wherein the computer mouse is effective to display a graphic element on the graphical user interface when the mouse is situated in a first area on the mouse pad, and wherein the computer mouse is effective to highlight a button on the control panel if the computer mouse is situated in a second area of the mouse pad.

7. The control panel according to claim 5, wherein the pointing device is enabled to control functionalities assigned to the highlighted hard key element.

8. The control panel according to claim 5, wherein the hard key element is a hard key control element or a display.

9. The control panel according to claim 5, wherein the hard key element is highlighted by at least one of a distinctive colour, a distinctive icon, a distinctive shape, a distinctive text size, and a distinctive text font.

10. The control panel according to claim 1, wherein the control panel is communicatively connected with a graphical user interface to assign the control elements of the control panel to the different groups.

11. The control panel according to claim 2, wherein the first group of control elements comprises a dedicated control element which puts a signal prepared in the fourth group on-air or into the status of a next on-air signal.

12. The control panel according to claim 1, wherein each group of control elements is associated with a dedicated display.

13. The control panel according to claim 12, wherein each dedicated display is adapted for being illuminated in different colours.

14. A video processing system comprising:
at least one video processing unit;
a control panel for controlling the at least one video processing unit, wherein the control panel comprises:
a plurality of hard key control elements which are arranged in different groups,
wherein a first group of control elements is assigned to select a predefined story for being broadcasted;
wherein a second group of control elements is assigned to select signals and scenes for a currently broadcasted story, the scenes being composed of several input signals including camera signals;
wherein a third group of control elements is assigned to select signals and scenes for a next story which is selectable for being broadcasted by operating a control element of the first group; and
wherein when the next story is put on-air by the activation of a control element of the first group, the current settings of the third group replace the settings of the second group.

* * * * *

UNITED STATES PATENT AND TRADEMARK OFFICE
CERTIFICATE OF CORRECTION

| | | |
|---|---|---|
| PATENT NO. | : 9,489,055 B2 | Page 1 of 1 |
| APPLICATION NO. | : 14/763604 | |
| DATED | : November 8, 2016 | |
| INVENTOR(S) | : Alfred Krug et al. | |

It is certified that error appears in the above-identified patent and that said Letters Patent is hereby corrected as shown below:

In the Claims

In Column 12, Line 35, the portion of the text reading -story on-air by activation- should read --story is put on-air by activation--

Signed and Sealed this
Tenth Day of January, 2017

Michelle K. Lee
*Director of the United States Patent and Trademark Office*